(12) United States Patent
McVay et al.

(10) Patent No.: US 10,377,912 B2
(45) Date of Patent: Aug. 13, 2019

(54) CONTAINER COATING COMPOSITIONS

(71) Applicant: PPG Industries Ohio, Inc., Cleveland, OH (US)

(72) Inventors: Robert McVay, Cincinnati, OH (US); Christopher Most, Wilder, KY (US); Ayaz Kutubuddin, West Chester, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 820 days.

(21) Appl. No.: 14/645,456

(22) Filed: Mar. 12, 2015

(65) Prior Publication Data
US 2016/0264811 A1 Sep. 15, 2016

(51) Int. Cl.
*C09D 127/06* (2006.01)
*B23K 31/02* (2006.01)
(Continued)

(52) U.S. Cl.
CPC ............. *C09D 127/06* (2013.01); *B05D 1/28* (2013.01); *B23K 31/02* (2013.01); *B23K 31/027* (2013.01); *B65D 7/04* (2013.01); *B65D 25/14* (2013.01); *B05D 2202/15* (2013.01); *B05D 2701/00* (2013.01); *B05D 2701/10* (2013.01); *B23K 2101/16* (2018.08); *B23K 2101/18* (2018.08); *B23K 2101/34* (2018.08); *B23K 2103/04* (2018.08); *B23K 2103/10* (2018.08); *C08L 2205/025* (2013.01); *C08L 2205/035* (2013.01)

(58) Field of Classification Search
CPC ........ C09D 127/06; B23K 31/02; B05D 1/28; B65D 25/14; B65D 7/04; C08L 2205/025; C08L 2205/035

USPC ......... 427/385.5, 386, 407.1, 108, 122, 123, 427/160, 207.1, 227, 265, 278, 388.1, 427/410, 421.1, 427.4, 458, 595, 79; 428/413, 35.8, 418, 461, 209, 336, 480, 428/688, 195.1, 208, 334, 36.6, 402, 414, 428/424.8, 425.8, 425.9, 446, 451, 457, 428/458, 463, 473.5, 623, 626, 671, 689, 428/702; 524/539, 112, 17, 236, 247, 524/317, 376, 379, 388, 391, 427, 501, 524/504, 522, 594, 604, 605, 873; 252/182.23, 182.14, 182.18, 502, 511, 75, 252/76

See application file for complete search history.

(56) References Cited

U.S. PATENT DOCUMENTS 3,843,484 A 10/1974 Kamiyoshi et al.
4,507,339 A 3/1985 Carbo et al.
(Continued)

FOREIGN PATENT DOCUMENTS

AU 6100073 B2 * 5/1991 ............. C08L 27/06
DE 2029629 12/1971
(Continued)

OTHER PUBLICATIONS

Masahiro (Masahri, JP2002097410A machine translation, 2002, p. 1-17).*

Primary Examiner — Gerard Higgins
Assistant Examiner — Kevin C Ortman, Jr.
(74) Attorney, Agent, or Firm — Diane R. Meyers, Esq.

(57) ABSTRACT

A coating composition comprising a polyester, a mixture of novolak and resole resins and a vinyl chloride polymer, and the use of these compositions to coat metal containers is disclosed.

17 Claims, 1 Drawing Sheet

(51) Int. Cl.
*B05D 1/28* (2006.01)
*B65D 8/00* (2006.01)
*B65D 25/14* (2006.01)
*B23K 101/16* (2006.01)
*B23K 101/18* (2006.01)
*B23K 101/34* (2006.01)
*B23K 103/04* (2006.01)
*B23K 103/10* (2006.01)

(56) References Cited

U.S. PATENT DOCUMENTS

| | | | |
|---|---|---|---|
| 5,013,589 A | 5/1991 | Schäfer et al. | |
| 5,112,887 A | 5/1992 | Colon et al. | |
| 6,730,361 B2 | 5/2004 | Parekh et al. | |
| 2003/0170396 A1 * | 9/2003 | Yokoi | C08G 59/08 427/386 |
| 2013/0052380 A1 | 2/2013 | Most et al. | |
| 2013/0280453 A1 | 10/2013 | Seneker et al. | |
| 2014/0050869 A1 | 2/2014 | Most et al. | |

FOREIGN PATENT DOCUMENTS

| | | | |
|---|---|---|---|
| EP | 0254755 | 2/1988 | |
| EP | 0371397 | 6/1990 | |
| JP | 2002097410 A * | 4/2002 | C09D 161/06 |
| PL | 122455 | 7/1982 | |
| RU | 2420552 C2 | 6/2011 | |
| WO | WO 0228939 | 4/2002 | |
| WO | WO 2007062735 | 6/2007 | |

\* cited by examiner

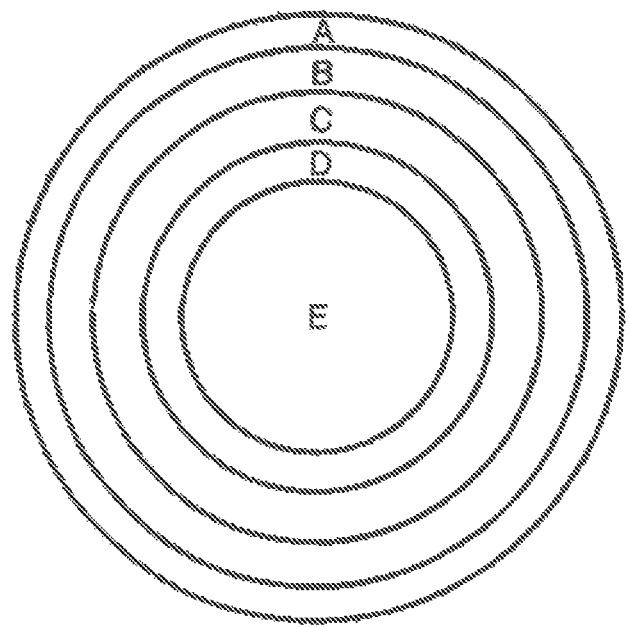

CONTAINER COATING COMPOSITIONS

FIELD OF THE INVENTION

The present invention relates to compositions for coating metal containers; to methods for applying the compositions to the containers, and to the resultant coated container.

BACKGROUND OF THE INVENTION

A wide variety of coatings have been used to coat the surfaces of food and beverage containers. For example, metal cans are sometimes coated using coil coating or sheet coating operations, that is, a coil or sheet of a metal substrate, for example, steel or aluminum, is coated with a suitable composition and cured. The coated substrate is then formed into the can body. Coatings for food and beverage containers must be capable of high speed application to the substrate while providing the necessary properties when cured to perform in a demanding end use. For example, the coating should be safe for food contact, be sufficiently flexible to withstand the forming operation and have excellent adhesion to the substrate.

Many of the coating compositions for food and beverage containers are based on epoxy resins that are the polyglycidyl ethers of bisphenol A. Bisphenol A in packaging coatings either as bisphenol A itself (BPA), derivatives thereof, such as diglycidyl ethers of bisphenol A (BADGE), are problematic. Although the balance of scientific evidence available to date indicates that small trace amounts of BPA or BADGE that might be released from existing coatings does not pose health risks to humans, these compounds are nevertheless perceived by some as being harmful to human health. Consequently, there is a strong desire to eliminate these compounds from coatings for food and beverage containers.

Compositions comprising polyesters and resole resins have been investigated as substitutes for the bisphenol A-containing epoxy resins. Although these compositions have good cured coating properties, such as solvent resistance and corrosion resistance and inertness to many foods and beverages, they have insufficient flexibility to withstand the forming process leading to cracks and fissures in the cured coating resulting in coating failure.

The present invention overcomes these problems by providing a polyester-resole composition that has enhanced flexibility while maintaining good cured coating properties.

SUMMARY OF THE INVENTION

The present invention provides a coating composition comprising:
(a) 10 to 40 percent by weight of a polyester having a number average molecular weight of at least 15,000, an acid value of 4 or less and a hydroxyl value of 10 or less,
(b) 20 to 40 percent by weight of a phenolplast comprising:
(i) a resole resin,
(ii) a novolak resin,
in which the resin solids weight ratio of (i) to (ii) is from 2.0 to 4.0:1,
(c) 30 to 50 percent by weight of a vinyl chloride polymer;
the percentages by weight being based on weight of resin solids in the coating composition.

The present invention also provides a method of coating a container comprising:
(a) applying to the substrate a coating composition comprising:
(i) 10 to 40 percent by weight of a polyester having a number average molecular weight of at least 15,000, an acid value of 4 or less and a hydroxyl value of 10 or less,
(ii) 20 to 40 percent by weight of a phenolplast comprising:
(A) a resole resin,
(B) a novolak resin,
in which the resin solids weight ratio of (A) to (B) is from 2.0 to 4.0:1,
(iii) 30 to 50 percent by weight of a vinyl chloride polymer;
the percentages by weight being based on weight of resin solids in the coating composition;
(b) curing the composition on the substrate to form a coating, and
(c) forming a container from the coated substrate;
the percentages by weight being based on weight of resin solids in the coating composition.

The present invention further provides a coated container comprising a coating composition applied to at least a portion of the interior surface of the container in which the composition comprises:
(a) 10 to 40 percent by weight of a polyester having a number average molecular weight of at least 15,000, an acid value of 4 or less and a hydroxyl value of 10 or less,
(b) 20 to 40 percent by weight of a phenolplast comprising:
(i) a resole resin,
(ii) a novolak resin,
in which the resin solids weight ratio of (i) to (ii) is from 2.0 to 4.0:1,
(c) 30 to 50 percent by weight of a vinyl chloride polymer;
the percentages by weight being based on weight of resin solids in the coating composition.

BRIEF DESCRIPTION OF THE DRAWING

FIG. 1 is a plan view of a can end showing five areas (A-E) of the can end that were used for staining, corrosion and adhesion testing as presented in Table I.

DETAILED DESCRIPTION

Suitable polyester resins for use in the coatings of the present invention include resins formed by the reaction of one or more polyacid molecules and one or more polyol molecules. They are typically prepared by condensation (esterification) according to known processes [see, for example, Zeno Wicks, Jr., Frank N. Jones and S. Peter Pappas, *Organic Coatings: Science and Technology*, Vol. 1, pp. 122-132 (John. Wiley & Sons: New York, 1992)].

Suitable polyacids include adipic, azelaic, cyclohexane dicarboxylic, fumaric, isophthalic, maleic, phthalic, sebacic, succinic, terephthalic acids and anhydrides and esters thereof, and mixtures thereof.

Suitable polyol molecules include ethylene glycol, propylene glycol, butylene glycol, neopentyl glycol, cyclohexane diol, cyclohexane dimethanol, hexane diol, substituted propane diols (e.g., 2-methyl, 1,3 propane did), substituted butane diols, substituted pentane diols, substituted hexane diols, diethylene glycol and triols, and mixtures thereof.

Suitable polyesters for use in the present invention have relatively high molecular weights and low functionality. For example, the polyester should have a number average molecular weight of at least 15,000, such as at least 18,000, such as between 20,000 and 50,000, and optimally between about 25,000 and 45,000 Daltons. The acid and hydroxyl functionality should be low, that is, an acid number below about 10, such as below about 7.5, such as below about 4, and a hydroxyl number (OH number) below about 20, such as below about 10.

Polyesters suitable for use in the coating compositions of the invention are commercially available from Toybo as MD-1930.

The polyesters are present in the coating composition in amounts of 10 to 40, such as 15 to 30 percent by weight, based on resin solids content in the coating composition.

The phenolplasts are condensates of phenol with formaldehyde and those which are useful in the coating compositions of the present invention are mixtures of novolak resins and resole resins.

The novolak resins are so-called one-step phenolic resins. The novolaks are prepared by using a molar ratio of formaldehyde to phenol of less than about 1:1 in the presence of a catalyst that is acidic under appropriate reaction conditions. Novolaks are fusible and soluble and do not themselves pass into a crosslinked state. The novolaks are believed to be chain-like molecules having the following typical structure:

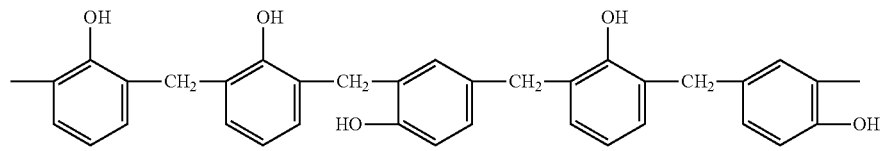 [SMILES: Cc1cc(Cc2cccc(Cc3ccc(O)c(Cc4cccc(Cc5cccc(C)c5O)c4O)c3)c2O)ccc1O]

Novolak resins are commercially available from Durez Corporation as 33768.

The resole resins employed in the invention are prepared with larger mole ratios of formaldehyde to phenol than is employed to prepare the novolaks. Under the influence of alkaline catalysts, phenol reacts with formaldehyde to attach hydroxymethyl (methylol) groups to form one to all three of the phenolic ortho and pare positions with or without the establishment of methylene linkages between the phenolic nuclei. Such resins may be cured to the thermoset (crosslinked) condition by application of heat.

The resole resins have the following typical structure:

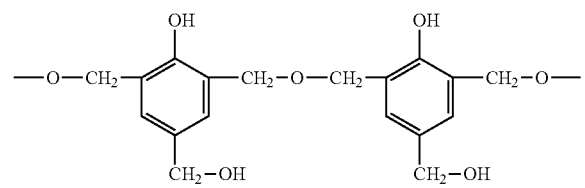

The resole resins are commercially available from Allnex as PR516.

It is believed that the mixture of novolak and resole resins provides an excellent blend of thermoset film properties along with the flexibility needed in the container-forming process.

Typically, the phenolplast is present in the coating compositions in amounts of 20 to 40, such as 25 to 35 percent by weight, based on resin solids in the coating compositions. To provide the desired blend of cured film properties, the resin solids weight ratio of the resole resin to the novolak resin is typically from 2.0 to 4.0:1, such as 2.5 to 3.5:1.

To further enhance the flexibility of the coating compositions of the invention, 30 to 50, such as 35 to 45 percent by weight, based on weight of resin solids of a vinyl chloride polymer is included in the compositions. The vinyl chloride polymer typically includes both a dispersion grade vinyl chloride polymer and a solution grade vinyl chloride polymer.

Referring to the dispersion grade vinyl chloride polymer, these polymers contain at least approximately 95 percent by weight of polymerized vinyl chloride, the balance of the polymer being any ethylenically unsaturated material copolymerizable with vinyl chloride, such as vinyl acetate.

In addition to the vinyl chloride content of the copolymer, the vinyl chloride dispersion should be of high molecular weight illustrated by an intrinsic viscosity measured in a 1% solution of cyclohexanone at 20° C., of at least 1.0. Additionally, the dispersion grade resin should be in a finely divided particulate condition. The high molecular weight vinyl chloride polymers are dispersed in an organic solvent to achieve the desired fluidity of the composition. In general, the solvent is essentially a non-solvent for the vinyl chloride polymer resin, whereas it may be a solvent for the polyester and the phenolplast resins. Typical organic solvents include volatile liquid aromatics such as benzene, toluene, xylene, ethyl benzene and isopropyl benzene, as well as aliphatic ketones such as methyl ethyl ketone, methyl isobutyl ketone, diacetone ketone, butyl Carbitol, diethylene glycol monoethyl ether, cyclopentane, cyclohexane, and the like. The vinyl chloride polymer dispersions are commercially available from Mexichem as Geon Vinyl.

The solution grade vinyl chloride polymer contains a major portion of copolymerized vinyl chloride such as at least 75 percent by weight vinyl chloride with the balance of the polymer constituted by ethylenically unsaturated materials other than vinyl chloride and copolymerizable therewith, usually vinyl acetate. The vinyl chloride content of the polymer typically does not exceed 90 percent by weight. The term "solution grade" designates a polymer having an intrinsic viscosity measured in a 1% solution of cyclohexanone at 20° C. of less than 0.8, such as less than 0.6. Usually the solution grade vinyl chloride polymer includes a small portion of about 0.5 to 5 percent by weight of the copolymer of a carboxyl-containing monomer, usually about 1 percent by weight of maleic acid or maleic anhydride present. The presence of the acidic monomer is important in providing superior adhesion to metal.

The solution grade vinyl chloride polymer is soluble in ketone solvents, for example, isophorone, methyl isobutyl ketone, acetone, methyl ethyl ketone and isoamyl ketone. Blends of ketones alone or in conjunction with aromatic solvents, for example, xylene, toluene and 100 flash or 150 flash aromatic naphtha can also be used.

Solution grade vinyl chloride polymers are available from Shanghai PG Chem Co LTD as Vinyl Resin VMA.

The resin solids weight ratio of the dispersion grade vinyl chloride polymer to solution grade vinyl chloride polymer is typically from 4 to such as 5 to 6:1, to provide desirable balance of corrosion resistance, flexibility and adhesion.

Because of the use of vinyl chloride polymers in the coating compositions of the invention, the compositions may be susceptible to darkening due to dehydrochlorination during curing at elevated temperatures. Accordingly, a hydrochloride scavenger such as epoxidized soybean oil may be present in the coating composition in amounts up to 10, such as 5 to 8 percent by weight, based on weight of resin solids of the coating composition.

The polyester resin, novolak and resole resins as well as the vinyl chloride polymers are typically provided as solutions or dispersions in organic solvents. However, additional organic solvents may be added to provide acceptable viscosities for coating applications. Examples of such solvents are those mentioned above. The coating compositions typically have resin solids contents of from 35 to 50, such as 40 to 45 percent by weight.

The coating compositions of the present invention may also include other optional ingredients that do not adversely affect the coating composition or a cured coating composition resulting therefrom. Such optional ingredients are typically included in a coating composition to enhance composition aesthetics to facilitate manufacturing, processing, handling and application of the composition, and to further improve the particular functional property of a coating composition or a cured coating composition resulting therefrom.

Such optional ingredients include, for example, catalysts, pigments, fillers, lubricants, anticorrosive agents, flow agents, thixotropic agents, dispersing agents, antioxidants, adhesion promoters, and mixtures thereof. Each optional ingredient is included in a sufficient amount to serve its intended purpose, but not in such amount to adversely affect the coating composition or a cured coating composition resulting therefrom.

In certain embodiments, the compositions and/or the resultant coatings on the container may be substantially free, may be essentially free and/or may be completely free of bisphenol A and derivatives or residues thereof, including bisphenol A ("BPA") and bisphenol A diglycidyl ether ("BADGE"). Such compositions and/or coatings are sometimes referred to as "BPA non intent" because EPA, including derivatives or residues thereof, are not intentionally added but may be present in trace amounts because of impurities or unavoidable contamination from the environment. The compositions and/or coatings can also be substantially free and may be essentially free and/or may be completely free of bisphenol F and derivatives or residues thereof, including bisphenol F and bisphenol F diglycidyl ether ("BFDGE"). The term "substantially free" as used in this context means the compositions and/or coatings contain less than 1000 parts per million (ppm), "essentially free" means less than 100 ppm and "completely free" means less than 20 parts per billion (ppb) of any of the above-mentioned compounds, derivatives or residues thereof.

After selection of the proper proportions of the ingredients, no special mixing techniques are necessary for preparing the coating composition. The Ingredients are typically mixed together with low to moderate shear mixing to form a uniform dispersion.

The compositions of the invention are particularly well adapted for use as internal surface coatings for foodstuffs, packaging containers, i.e., two-piece cans and three-piece cans. The compositions are typically applied to metal substrates and cured into films at high speed, on high-speed coating lines (e.g., coil coating lines). The coating agents are typically applied in a roller coating process either continuously on coil lines or batch-wise on sheet coating lines to thin metals such as aluminum, tinplate, tin free steel or chromed steel, and then reacted at high temperatures. The coated metals thus produced are then shaped to form the desired metal packaging articles by processes such as, for example, deep-drawing, stamping, creasing, welding and flanging. This processing requires very high flexibility and excellent adhesion of the coating agents used. In such applications, the coatings preferably should not experience any change in the protective function due to the forming processes and, in addition, should preferably exhibit suitable adhesion with no breaks in the coating.

The compositions are generally applied to metal sheets in one of two ways. The coated metal sheets may be fabricated into can bodies or ends in a later stage of the manufacturing operation.

One process, cased the sheet bake process, involves roll coating large planar metal sheets. These sheets are then placed upright in racks and the racks are typically placed in ovens for about 10 minutes to achieve peak metal temperatures of about 180° C. to about 205° C. In a second process known as coil coating, large rolls of thin gage metal (e.g., steel or aluminum) are unwound, roll coated, heat cured and rewound. During the coil coating process, the total residence time in the curing ovens will vary from about 2 seconds to about 20 seconds with peak metal temperatures typically reaching about 215° C. to about 300° C.

A coil coating is described as the coating of a continuous coil composed of a metal (e.g., steel or aluminum). Once coated, the coating coil is typically subjected to a short thermal curing cycle, which leads to the drying and curing of the coating. Coil coatings provide coated metal (e.g., steel and/or aluminum) substrates that can be fabricated into formed articles such as two-piece food cans, three-piece food cans, food can ends, beverage can ends and the like.

A sheet coating is described as the coating of separate pieces of a variety of materials (e.g., steel or aluminum) that have been pre-cut into square or rectangular planar "sheets". Typical dimensions of these sheets are approximately one square meter. Once coated, each sheet is cured. Once dried and cured, the sheets of the coated substrate are collected and prepared for subsequent fabrication. Sheet coatings provide coated metal (e.g., steel or aluminum) substrate that can be successfully fabricated into formed articles such as two-piece food cans, three-piece food cans, food can ends, drawn and ironed cans, beverage can ends and the like. For three-piece cans, the coated planar sheet is slit into body blanks and then formed into cylinders and welded at the side seam. A can end is affixed to an open end of the container, the cylinder filled with food or beverage and a can end affixed to the open end of the container and the container sealed.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. Polycarboxylic add includes lower alkyl esters, $C_1$-$C_4$, and anhydrides where they exist. Also, as used herein, the term "polymer" is meant to refer to prepolymers, oligomers and both homopolymers and copolymers; the prefix "poly" refers to two or more. When ranges are given, any endpoints of those ranges and/or numbers within those ranges can be combined with the scope of the present invention, "Including", such as", for example" and like terms means "including/such as/for example but not limited to". As used herein, the molecular weights are on a number average basis and are determined by gel permeation chromatography using a polystyrene standard. Food or foods include solid foodstuffs and liquid foodstuffs such as beverages.

EXAMPLES

The following examples are offered to aid in understanding of the present invention and are not to be construed as limiting the scope thereof. Unless otherwise indicated, all parts and percentages are by weight.

The following examples show the formulation of four (4) coating compositions. One composition was in accordance with the invention and contained a high molecular weight, low functionality polyester, a resole resin, a novolak resin and a polyvinyl chloride polymer. The remaining three compositions were formulated for comparative purposes. The second composition was similar to the first but without the polyvinyl chloride polymer. The third composition was similar to the first but without the novolak resin and the fourth composition was similar to the first but without the resole resin.

The four coating compositions were roll-coat applied to tin plated steel substrates and the coatings cured at 204.4° C. for 12 minutes to form a cured coating (15 to 18 mg/in$^2$).

The coated substrates were evaluated for flexibility by wedge bend testing and by so-called "screwcap testing". Also, 307 can ends (3 7/16 diameter) were stamped from the coated substrates and evaluated for the integrity of the coating by the WACO Enamel Rater Test. The coated can ends were also evaluated for "Hairing" that is a phenomena of thin hair-like strands that delaminate from the can ends upon stamping. Hairing is problematic to the can end fabricator because it fouls the stamping equipment. The equipment must be shut down periodically to remove the buildup of the "hairs". Finally, the coated can ends were evaluated for staining, corrosion and adhesion by pack testing for three weeks using acidified tomatoes.

For control purposes, two commercial end coating compositions were also evaluated. One commercial product was a polyester/phenolic/urethane coating composition available from PPG Industries as "commercial BPA-NI product control A", and the second commercial composition was an epoxy-phenolic composition available from PPG Industries as "epoxy commercial control B".

Example 1

A coating composition in accordance with the invention was prepared from the following mixture of ingredients:

| Ingredient | Parts by Weight |
| --- | --- |
| Resole Resin[1] | 14.80 |
| Polyester[2] | 19.49 |
| Novolak Resin[3] | 4.93 |
| Polyvinyl Chloride[4] | 31.05 |
| Polypropylene[5] | 0.70 |
| Butylated Benzoguanamine[6] | 1.23 |
| N-butanol | 2.25 |
| Propylene Glycol Monomethyl Ether | 1.95 |
| Methyl Ether Propylene Glycol Acetate | 18.80 |
| 2-Butoxyethanol | 3.00 |
| 2-Butoxyethanol Acetate | 2.85 |
| Aromatic Solvent-100 Type | 8.09 |
| Xylene | 0.25 |
| Additol XI 480[7] | 0.10 |

[1]VPR 827-70 MAPC from Allnex.
[2]WEL 2200 from Bostik; $M_n$ = 42,000; hydroxyl number 2; acid number 8.
[3]DUREZ 32-518 from Durez.
[4]Available from Mexichem as GEON 178.
[5]Available from Micro Powders INC as MICROPOWDER 500.
[6]Available from Cytec as CYMEL 1123.
[7]From Allnex.

Example 2 (Comparative)

A coating composition similar to Example 1 was prepared but without the polyvinyl chloride.

Example 3 (Comparative)

A coating composition similar to Example was prepared but without the novolak resin.

Example 4 (Comparative)

A coating composition similar to Example 1 was prepared but without the resole resin.

Example 5 (Control)

A coating composition available from PPG Industries as a BPA-NI high molecular weight polyester coating was made available and tested.

Example 6 (Control)

A coating composition available from PPG Industries as a commercial epoxy coating was made available and tested.

The coating compositions of Examples 1-6 were roll-coat applied to both tin-plated steel substrates and can ends and cured as generally described above. The can ends were stamped from flat sheet stock. The coated substrates and the coated can ends were then evaluated as generally described above. The results of the testing are reported in Tables I and II below.

TABLE I

| Example No. | Avg ER[1] | Staining[2] | Corrosion[2] | | | | | Adhesion[2] | | | | |
|---|---|---|---|---|---|---|---|---|---|---|---|---|
| | | | A | B | C | D | E | A | B | C | D | E |
| 1 | 2.2 | 9 | 4.9 | 9.8 | 7.8 | 8.2 | 8 | 6 | 8.2 | 9.1 | 8.1 | 9 |
| 2 (Comparative) | 2.1 | 0 | 0 | 0 | 0 | 0 | 0 | 0 | 0 | 0 | 0 | 1 |
| 3 (Comparative) | 12.8 | 1 | 6.3 | 7.1 | 8.2 | 7.3 | 7 | 6.5 | 8.5 | 5 | 7.3 | 9.5 |
| 4 (Comparative) | 18.8 | 1 | 1 | 2.2 | 3.5 | 3 | 7.8 | 6.3 | 2 | 1 | 3.5 | 7 |
| 5 (Control) | 1.8 | 7 | 0 | 0 | 0 | 0 | 0 | 0 | 2 | 3 | 2.5 | 5 |
| 6 (Control) | 1.6 | 4 | 1.8 | 6.2 | 5 | 5 | 1 | 0 | 0 | 0 | 1 | 5 |

[1]WACO Enamel Rater Test: The WACO Enamel Rater Test determines the integrity of a fabricated can end by quantifying metal exposure. The end is secured by vacuum to the electrolyte-filled and electrode-containing end fixture. Fixture and specimen are inverted so that electrode and the product side of the end come into contact with the electrolyte solution and the edge of the sample contacts a metal chisel, completing the circuit. The instrument then applies a constant voltage (normally 6.3 VDC) across the coated surface and measures the resulting current at the industry standard of 4 seconds duration. The magnitude of the reading is directly proportional to the amount of exposed metal in the test sample. A low reading is desirable since that indicates there is very little exposed metal on the end. An enamel rater reading of 5.0 or less is considered commercial, any higher values are regarded as failing. The ends were 307 type ends.
[2]Staining, corrosion and adhesion were determined after pack testing. In this testing, a can was packed with acidified tomatoes in which the tomatoes were acidified with citric acid to a pH of 2 and heated to 160-180° F. (71-82° C.). The coated can ends (top and bottom) were seamed onto the cans containing the acidified tomatoes. The cans were at least 90% full (about ¼ inch head space), retorted for 60 minutes at 250° F. (121° C.) and stored at 120° F. (49° C.) for three weeks. The rating scale used was from 0 to 10, where 0 is complete failure and 10 is no failure. The results are average values for 10 can ends at five areas on the can, that is, the areas A through E as shown in FIG. 1.

For the adhesion test, a value of 9 indicates 90% of the coating remained adhered to the substrate in the area of the testing conducted and in accordance with ASTM D-3359, Test Method B, using Scotch 610 tape.

For staining, a rating of 7 indicates 70% of the coating remains unstained in the area of testing.

For corrosion, a rating of 6 indicates 60% of the coating in the area of the testing remains uncorroded.

TABLE II

| Example No. | Wedge Bend[1] | Screwcap[2] | Hairing[3] |
|---|---|---|---|
| 1 | 21.5 | 1 | 1 |
| 2 (Comparative) | 50 | 0 | 0 |
| 3 (Comparative) | 19 | 1 | 1 |
| 4 (Comparative) | 13 | 1 | 0 |
| 5 (Control) | 19.5 | 1 | 0 |
| 6 (Control) | 2.5 | 1 | 0 |

[1]The wedge bend test involves bending a coated test specimen over a 3 mm. mandrel to form a test wedge. The test wedge is then impacted along the deformation axis with a 2.4 kg. weight dropped from a height of 60 cm. The deformed test wedge is then immersed in an aqueous acidified copper sulfate solution to stain exposed metal in the impact area. The millimeters of coating failure along the deformation axis of the test wedge is reported.
[2]Screwcap test involves taking a coated 1.5 x 6 inch panel and stamping out what looks like a screw cap on a plastic beverage bottle. The amount of draw was about one inch. The specimens were then immersed in an acidified copper sulfate solution for 2 minutes. If no metal was exposed and stained, a rating of 1 was given. If metal was exposed and stained, a rating of 0 was given.
[3]The hairing test involves stamping out 10 can ends and bending the circumference of the ends as is done prior to seaming. If any hair-like strands (hairing) are formed in the stamping and bending operation, a rating of 0 or failure is reported. A value of 1 is given for no hairing.

The data reported in Tables I and II above shows the importance of using the resole and the novolak resins and the polyvinyl chloride in combination with the polyester in the curing compositions. Staining and corrosion resistance and adhesion are superior to comparable coatings prepared with compositions but not containing either the resole or novolak resins or the polyvinyl chloride. Also, the compositions of the invention were superior in this regard to the two controls. Wedge bend, screwcap and hairing tests showed the importance of polyvinyl chloride. The hairing test also showed the importance of the inclusion of the resole resin in the coating compositions and the superiority of the coating compositions of the invention compared to the commercial controls.

Whereas particular embodiments of this invention have been described above for purposes of illustration, it will be evident to those skilled in the art that numerous variations of the details of the present invention may be made without departing from the invention as defined in the appended claims.

Although various embodiments of the invention have been described in terms of "comprising", embodiments consisting essentially of or consisting of are also within the scope of the present invention.

What is claimed is:

1. A coating composition comprising:
   (a) 10 to 40 percent by weight of a polyester having a number average molecular weight of at least 15,000, an acid value of below 10 and a hydroxyl value of below 20,
   (b) 20 to 40 percent by weight of a phenolplast comprising:
      (i) a resole resin,
      (ii) a novolak resin prepared by reacting formaldehyde and phenol in a molar ratio of less than about 1:1 in the presence of an acid catalyst,
      in which the resin solids weight ratio of (i) to (ii) is from 2.0 to 4.0:1,
   (c) 30 to 50 percent by weight of a vinyl chloride polymer; the percentages by weight being based on weight of resin solids in the coating composition.

2. The coating composition of claim 1 in which the polyester has a number average molecular weight of from 20,000 to 50,000, an acid value of below 7.5 and a hydroxyl value of below 10.

3. The coating composition of claim 1 in which the weight ratio of (i) to (ii) is from 2.5 to 3.5:1.

4. The coating composition of claim 1 in which the vinyl chloride polymer is dispersed in an organic solvent.

5. The coating composition of claim 1 in which the vinyl chloride polymer has an intrinsic viscosity measured in a 1% solution of cyclohexanone at 20° C. of at least 1.0.

6. The coating composition of claim 4 that additionally contains a vinyl chloride interpolymer with maleic acid or anhydride dissolved in an organic solvent.

7. The coating composition of claim 6 in which the vinyl chloride interpolymer has an intrinsic viscosity measured in a 1% by weight solution of cyclohexanone of less than 0.8.

8. The coating composition of claim 6 in which the resin solids weight ratio of vinyl chloride polymer dispersion in organic solvent to vinyl chloride interpolymer dissolved in organic solvent is from 4 to 7:1.

9. The coating composition of claim 1 which is substantially free of bisphenol A and diglycidyl ethers of bisphenol A.

10. The coating composition of claim 1 which is essentially free of bisphenol A and diglycidyl ethers of bisphenol A.

11. The coating composition of claim 1 which is completely free of bisphenol A and diglycidyl ethers of bisphenol A.

12. A method of coating a container comprising:
(a) applying to the substrate a coating composition comprising:
   (i) 10 to 40 percent by weight of a polyester having a number average molecular weight of at least 15,000, an acid value of below 10 and a hydroxyl value of below 20,
   (ii) 20 to 40 percent by weight of a phenolplast comprising:
      (A) a resole resin,
      (B) a novolak resin prepared by reacting formaldehyde and phenol in a molar ratio of less than about 1:1 in the presence of an acid catalyst,
      in which the resin solids weight ratio of (A) to (B) is from 2.0 to 4.0:1,
   (iii) 30 to 50 percent by weight of a vinyl chloride polymer;
   the percentages by weight being based on weight of resin solids in the coating composition;
(b) curing the composition on the substrate to form a coating, and
(c) forming a container from the coated substrate.

13. The method of claim 12 in which the substrate is aluminum.

14. The method of claim 12 in which the composition is applied by roll coating to a planar sheet.

15. The method of claim 12 in which the coated planar sheet is slit into body blanks that are then formed into a cylinder and welded at the side seam.

16. A coated container comprising a coating composition applied to at least a portion of the interior surface of the container in which the composition comprises:
(a) 10 to 40 percent by weight of a polyester having a number average molecular weight of at least 15,000, an acid value of below 10 and a hydroxyl value of below 20,
(b) 20 to 40 percent by weight of a phenolplast comprising:
   (i) a resole resin,
   (ii) a novolak resin prepared by reacting formaldehyde and phenol in a molar ratio of less than about 1:1 in the presence of acid catalyst,
   in which the resin solids weight ratio of (i) to (ii) is from 2.0 to 4.0:1,
(c) 30 to 50 percent by weight of a vinyl chloride polymer;
the percentages by weight being based on weight of resin solids in the coating composition.

17. The coated container of claim 16 that is a coated three-piece can.

* * * * *